(12) United States Patent
Dai et al.

(10) Patent No.: US 10,672,203 B2
(45) Date of Patent: Jun. 2, 2020

(54) OLFACTORY-BASED VEHICLE DIAGNOSTICS

(71) Applicant: TOYOTA JIDOSHA KABUSHIKI KAISHA, Toyota-shi, Aichi-ken (JP)

(72) Inventors: Siyuan Dai, Mountain View, CA (US); Shinichi Shiraishi, Mountain View, CA (US)

(*) Notice: Subject to any disclaimer, the term of this patent is extended or adjusted under 35 U.S.C. 154(b) by 108 days.

(21) Appl. No.: 15/644,184

(22) Filed: Jul. 7, 2017

(65) Prior Publication Data
US 2019/0012852 A1    Jan. 10, 2019

(51) Int. Cl.
| | |
|---|---|
| G07C 5/08 | (2006.01) |
| G07C 5/00 | (2006.01) |
| G02B 27/01 | (2006.01) |
| B60K 35/00 | (2006.01) |
| G06T 19/00 | (2011.01) |

(52) U.S. Cl.
CPC ........... *G07C 5/0808* (2013.01); *B60K 35/00* (2013.01); *G02B 27/0101* (2013.01); *G07C 5/008* (2013.01); *G07C 5/0825* (2013.01); *B60K 2370/1531* (2019.05); *B60K 2370/178* (2019.05); *B60K 2370/186* (2019.05); *B60K 2370/334* (2019.05); *G02B 27/0149* (2013.01); *G02B 27/0179* (2013.01); *G02B 2027/0141* (2013.01); *G02B 2027/0154* (2013.01);
(Continued)

(58) Field of Classification Search
None
See application file for complete search history.

(56) References Cited

U.S. PATENT DOCUMENTS

| | | | | |
|---|---|---|---|---|
| 2017/0050750 A1* | 2/2017 | Barraci | ............... | G07C 5/0808 |
| 2017/0309091 A1* | 10/2017 | Cameron | ............. | G07C 5/0808 |

FOREIGN PATENT DOCUMENTS

| | | |
|---|---|---|
| JP | 2002-099325 | 4/2002 |
| JP | 2002-140797 | 5/2002 |

(Continued)

OTHER PUBLICATIONS

JPO, Notice of Reason for Rejection for Japanese Patent Application No. 2018-114681, dated Apr. 19, 2019, 5 pages.
(Continued)

*Primary Examiner* — Christian Chace
*Assistant Examiner* — Kyung J Kim
(74) *Attorney, Agent, or Firm* — Burbage Law, P.C.; Jon-Michael Burbage; Elizabeth Ruzich

(57) ABSTRACT

The disclosure includes a method comprising collecting sensor data from an olfactory sensor set of a vehicle, wherein the sensor data describes sensor measurements of an odor of a corresponding vehicle component, wherein the sensor data is received by a server. The method further includes receiving failure data from the server that describe a match between the sensor data and a fingerprint compound that corresponds to a failed vehicle component. The method further includes identifying the corresponding vehicle component that is described by the failure data. The method further includes identifying the corresponding vehicle component that is described by the failure data. The method further includes generating a notification based on the failure data and the corresponding component. The method further includes providing the notification to a driver of the vehicle.

20 Claims, 7 Drawing Sheets

(52) U.S. Cl.
CPC ........... *G02B 2027/0181* (2013.01); *G02B 2027/0185* (2013.01); *G06T 19/006* (2013.01)

(56) References Cited

FOREIGN PATENT DOCUMENTS

| JP | 2002-334168 | 11/2002 |
| JP | 2004-053582 | 2/2004 |
| JP | 2004-301568 | 10/2004 |
| JP | 2008-256387 | 10/2008 |
| JP | PO2015-005075 | 1/2015 |
| JP | 2017-091541 | 5/2017 |

OTHER PUBLICATIONS

JPO, Notice of Reason for Rejection for Japanese Patent Application No. 2018-114681, dated Nov. 5, 2019, 4 pages.

\* cited by examiner

600

```
┌─────────────────────────────────────────────────────────────────────────┐
│ Collect sensor data from an olfactory sensor set of a vehicle, where    │
│ the sensor data describes sensor measurements of an odor of a           │
│ corresponding vehicle component 605                                     │
└─────────────────────────────────────────────────────────────────────────┘
                                    ↓
┌─────────────────────────────────────────────────────────────────────────┐
│ Transmit the sensor data to a network that transmits the sensor data    │
│ to a server 610                                                         │
└─────────────────────────────────────────────────────────────────────────┘
                                    ↓
┌─────────────────────────────────────────────────────────────────────────┐
│ Receive failure data from the server that describe a match between the  │
│ sensor data and a fingerprint compound that corresponds to a failed     │
│ vehicle component 615                                                   │
└─────────────────────────────────────────────────────────────────────────┘
                                    ↓
┌─────────────────────────────────────────────────────────────────────────┐
│ Identify the corresponding vehicle component that is described by the   │
│ failure data 620                                                        │
└─────────────────────────────────────────────────────────────────────────┘
                                    ↓
┌─────────────────────────────────────────────────────────────────────────┐
│ Generate a notification based on the failure data and the corresponding │
│ vehicle component 625                                                   │
└─────────────────────────────────────────────────────────────────────────┘
                                    ↓
┌─────────────────────────────────────────────────────────────────────────┐
│ Provide the notification to a driver of the vehicle 630                 │
└─────────────────────────────────────────────────────────────────────────┘
```

Figure 6

OLFACTORY-BASED VEHICLE DIAGNOSTICS

BACKGROUND

Vehicle components break down over time. Some components emit particular odors that indicate that the components have failed or are about to fail. Not all drivers are capable of recognizing the odors that are associated with vehicle component failure. In some situations, a vehicle component may be situated within the interior of a vehicle such that no human could detect if it emitted an odor associated with vehicle component failure. In other situations, the odor may be so faint that very few humans could detect it. Furthermore, even if a human could detect an odor, the human may not be able to identify it as an element of vehicle component failure and therefore may not know that the vehicle needs servicing. As a result, a driver may drive a vehicle with damaged vehicle components. The vehicle component failure may also result in additional damage to the vehicle, which may not be discovered until serious damages has occurred within the vehicle.

Existing solutions notify a driver that the vehicle needs servicing based on monitoring a time of service for different vehicle components and monitoring certain critical variables relevant to particular components, such as PSI measurements that correspond to a "check tire pressure" light being triggered, etc. However, this type of monitoring will fail to detect many types of vehicle component failure and will fail to prevent certain types of damage that result from vehicle component failure.

SUMMARY

The specification solves the problem of failing to detect odors that indicate vehicle component failure by describing a system and method for detecting odors associated with vehicle component failure and notifying the driver when it is time to take a vehicle to a service station. The specification advantageously describes a way to identify vehicle component failure close in time to when the vehicle component failure occurs or is about to occur. As a result, damage to the vehicle as a result of vehicle component failure is minimized. In addition to preventing further damage to the vehicle components of the vehicle, this may result in the drive avoiding having to pay for costly repairs and extend the service life of the vehicle.

Described herein is a system according to some embodiments for notifying a driver of a vehicle of vehicle component failure. One general aspect includes a method that includes collecting sensor data from an olfactory sensor set of a vehicle, wherein the sensor data describes sensor measurements of an odor of a corresponding vehicle component, wherein the sensor data is received by a server. The method further includes receiving failure data from the server that describe a match between the sensor data and a fingerprint compound that corresponds to a failed vehicle component. The method further includes identifying the corresponding vehicle component that is described by the failure data. The method further includes generating a notification based on the failure data and the corresponding component. The method further includes providing the notification to a driver of the vehicle.

Implementations may include one or more of the following features. The method where providing the notification includes causing a notification light on a dashboard of the vehicle to become illuminated. The method where providing the notification includes displaying the notification on at least one of a head unit of the vehicle and a three-dimensional heads-up display. The method where the notification includes a description of the corresponding vehicle component. The method, further including capturing an image of the corresponding vehicle component that is described by the failure data, where the notification includes the image of the corresponding vehicle component. The method, further including indexing the sensor data by the corresponding component. The method, further including aggregating sensor data from multiple corresponding vehicle components and transmitting aggregated sensor data to a network that transmits the aggregated sensor data to the server, where identifying the corresponding vehicle component includes identifying the multiple corresponding vehicle components. The method where the failed vehicle component includes one or more of a belt, a hose, a brake, an engine cooling system, an exhaust system, a filter, and a clutch. The method where the one or more olfactory sensors of the vehicle include at least one of a MOSFET and a polymer.

One general aspect includes a system comprising: one or more processors coupled to a memory; a filter stored in the memory and executable by the one or more processors, the one or more processors causing the filter to: receive sensor data that originated from a vehicle and filter the sensor data to remove noise and generate filtered data; and an analyzer stored in the memory and executable by the one or more processors, the one or more processors causing the analyzer to: determine whether there is a match between the filtered data and failure data that corresponds to a failed vehicle component and responsive to determining that there is the match, transmitting the failure data to a network, wherein the network transmits the failure data to the vehicle.

Implementations may include one or more of the following features. The analyzer may determine a plurality of matches between the filtered data and a plurality of failed vehicle components. The one or more processors may further cause the analyzer to responsive to determining that there is not the match between the filtered data and the failure data that corresponds to the failed vehicle component, receive additional sensor data and continuing to determine whether there is the match between the filtered data and the failure data. The analyzer may include a first analyzer that analyzes the filtered data corresponding to a first vehicle component and a second analyzer that analyzes the filtered data corresponding to a second vehicle component.

One general aspect includes a computer program product including a non-transitory memory of an onboard vehicle computer system of a vehicle storing computer-executable code that, when executed by the onboard vehicle computer system, causes the onboard vehicle computer system to: collect sensor data from an olfactory sensor set of a vehicle, wherein the sensor data describes sensor measurements of an odor of a corresponding vehicle component, wherein the sensor data is received by a server, receive failure data from the server that describe a match between the sensor data and a fingerprint compound that corresponds to a failed vehicle component, identify the corresponding vehicle component that is described by the failure data, generate a notification based on the failure data and the corresponding component, and provide the notification to a driver of the vehicle.

Implementations may include one or more of the following features. Providing the notification may include displaying the notification on at least one of a head unit of the vehicle and a three-dimensional heads-up display. The notification may include a description of the corresponding vehicle component. The computer-executable code may further cause the onboard vehicle computer system to: capture an image of the corresponding vehicle component that is described by the failure data, where the notification includes the image of the corresponding vehicle component. The computer-executable code may further cause the onboard vehicle computer system to: index the sensor data by the corresponding component. The computer-executable code may further cause the onboard vehicle computer system to: aggregate sensor data from multiple corresponding vehicle components and transmit aggregated sensor data to a network that transmits the aggregated sensor data to the server, where identifying the corresponding vehicle component includes identifying the multiple corresponding vehicle components.

BRIEF DESCRIPTION OF THE DRAWINGS

The disclosure is illustrated by way of example, and not by way of limitation in the figures of the accompanying drawings in which like reference numerals are used to refer to similar elements.

FIG. 6 includes a flowchart of an example method for notifying a driver of vehicle component failure using an olfactory system according to some embodiments.

DETAILED DESCRIPTION

Vehicle components naturally deteriorate over time. Many drivers and some technicians struggle to identify when a vehicle component has failed. Many people rely on their gut feeling and compare a current situation to past situations to diagnose vehicle problems instead of relying on objective data.

One way of diagnosing a vehicle component failure is through odor. Several vehicle components emit an odor when they are experiencing vehicle component failure. For example, belts and hoses smell like burnt rubber, brakes smell sharp like bad cheese or burnt carpet, the engine cooling system smells sweet (e.g., from an ethylene glycol leak), the exhaust system has a rotten egg smell (e.g., from a catalytic converter or a fuel-injection problem), filters and fluids can cause the cabin to have a musty odor due to bacterial growth, and the clutch can smell like burnt paper when the clutch facing is burning.

These known odors, as well as other odors not listed above, can be used to accurately diagnose a failed vehicle component or even predict a vehicle component failure before it occurs. However, the odors may be difficult to detect by a human nose.

Some proposed solutions to the problem of detecting odors emitted by vehicle components may include using a set of olfactory sensors, or electronic noses, in order to diagnose problems within a vehicle based on the odors emitted by certain vehicle components. The specification includes an olfactory system in the vehicle that collects sensor data from the set of olfactory sensors. The specification further includes a comparison system that is part of a server that compares the sensor data to failure data to identify a match between the sensor data and a fingerprint compound that corresponds to vehicle component failure.

The olfactory system uses the failure data to generate a notification and provide the notification to a driver of the vehicle. The notification may be a light that appears on a dashboard of the vehicle or a notification that appears on a head unit or a heads-up display. The notification may include a description of the vehicle component failure and even an image of the vehicle component that failed.

Example Overview

Figure 1:
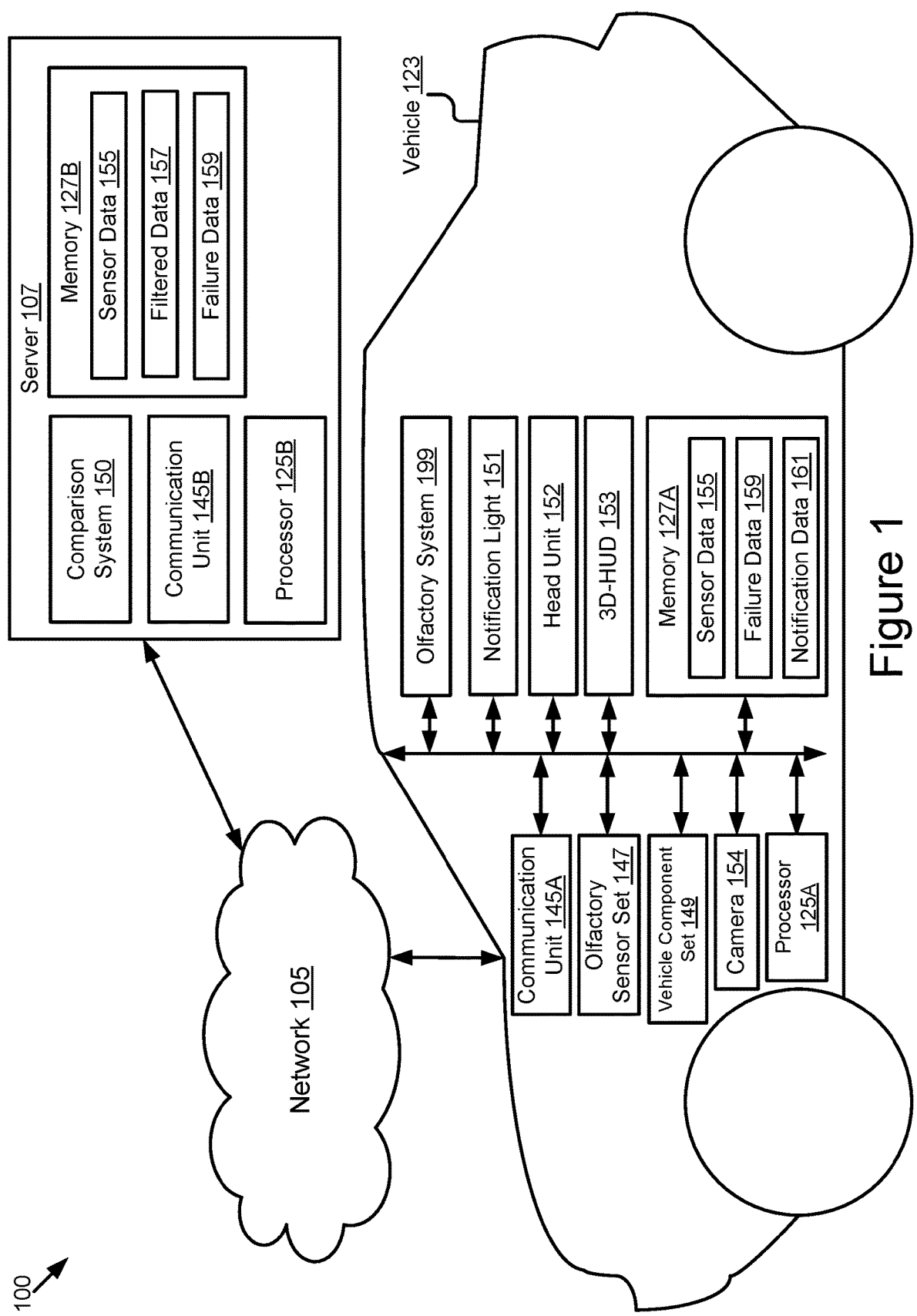
FIG. 1 is a block diagram illustrating an operating environment for an olfactory system according to some embodiments.

Referring to FIG. 1, depicted is an operating environment 100 for an olfactory system 199 and a comparison system 150 according to some embodiments. The operating environment 100 may include a real-world vehicle 123 (herein "vehicle 123" if singular, or "vehicles 123" if plural) and a server 107. These elements may be communicatively coupled to one another via a network 105. Although one vehicle 123, one server 107, and one network 105 are depicted in FIG. 1, in practice the operating environment 100 may include one or more vehicles 123, one or more servers 107, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, 5G, LTE, LTE-V2X, VoLTE or any other mobile data network or combination of mobile data networks. Further, the network 105 may include one or more IEEE 802.11 wireless networks. In some embodiments, the network 105 is a cellular network that is used because of its wide availability and suitable speed and bandwidth.

The network 105 may include one or more communication channels shared among the vehicle 123 and the server 107. The communication channel may include DSRC, LTE-V2X, full-duplex wireless communication, or any other wireless communication protocol. For example, the network 105 may be used to transmit a DSRC message, a DSRC probe, a basic safety message (BSM), or a full-duplex message including any of the data described herein.

The vehicle 123 is any type of vehicle. For example, the vehicle 123 is one of the following types of vehicles: a car;

a truck; a sports utility vehicle; a bus; a semi-truck; a drone; or any other roadway-based conveyance.

In some embodiments, the vehicle 123 includes one or more of the following elements: a processor 125A; a memory 127A; a communication unit 145A; an olfactory sensor set 147; a vehicle component set 149; a notification light 151; a head unit 152; a three-dimensional heads-up display (3D-HUD); and an olfactory system 199. The olfactory sensor set 147 and the vehicle component set 149 may include one or more olfactory sensors and one or more vehicle components, respectively.

The server 107 is a processor-based computing device. For example, the server 107 may include one or more of the following types of processor-based computing devices: a personal computer; a laptop; a tablet; a mainframe; or any other processor-based computing device that is operable to function as a server. The server 107 may include a hardware server.

In some embodiments, the server 107 includes one or more of the following elements: a processor 125B; a memory 127B; a communication unit 145B; and a comparison system 150.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.

Example Vehicle 123

In some embodiments, the processor 125 and the memory 127 may be elements of an onboard vehicle computer system. The onboard vehicle computer system may be operable to cause or control the operation of one or more of the following elements: the olfactory sensor set 147, the vehicle component set 149, the notification light 151, the head unit 152, the 3D-HUD 153, and the olfactory system 199. The onboard vehicle computer system may be operable to access and execute the data stored on the memory 127 to provide the functionality described herein for the olfactory system 199. The onboard vehicle computer system may be operable to execute the olfactory system 199 which causes the onboard vehicle computer system to execute one or more of the steps of the method 300 described below with reference to FIGS. 3A and 3B.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 may store one or more of the following elements: sensor data 155; failure data 159; and notification data 161.

The sensor data 155 includes digital data that describes one or more measurements recorded by the olfactory sensor set 147 as the olfactory sensor set 147 measures any odors that are emitted from the vehicle component set 149. For example, the olfactory system 199 includes software which, when executed by the processor 125, causes the olfactory sensor set 147 to record the sensor data 155 at intervals determined by the olfactory system 199.

The failure data 159 includes digital data that describe a match between the sensor data 155 and a fingerprint compound that corresponds to a failed vehicle component. The failure data 159 may be received from the server 107.

The notification data 161 includes instructions for generating a notification. For example, the notification data 161 includes instructions for causing a notification light 151 to be illuminated on the dashboard of the vehicle 123. In another example, the notification data 161 includes instructions for causing a notification to be displayed on the head unit 152 or the 3D-HUD 153.

In practice, the olfactory sensor set 147 may include a plurality of sensors that each record sensor data 155 for a plurality of different vehicle components in the vehicle component set 149. In some embodiments, sensor data 155 describes the measurements recorded by a plurality of olfactory sensors for a plurality of different vehicle components. Each olfactory sensor may generate a discrete set of sensor data 155. Each discrete set of sensor data 155 may correspond to a discrete instance of vehicle components. Each discrete set of sensor data 155 may include one or more bits of data that identify which particular vehicle component is being measured and described by the sensor data 155. In this way, the sensor data 155 is configured to describe the olfactory sensor measurements for a plurality of different vehicle components in a way that allows the different vehicle components to be analyzed and considered individually by the olfactory system 199 when generating the sensor data 155.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The olfactory sensor set 147 includes one or more olfactory sensors that are operable to measure odors emanating from the vehicle component set 149. The olfactory sensor set 147 may include a device that generates volatile compounds and a detection device that generates the sensor data 155 by detecting a change in electric properties and transforming the change into a digital value.

In some embodiments, the olfactory sensor set 147 includes many different types of electronic noses. For example, the olfactory sensor set 147 may include a metal-oxide-semiconductor field-effect transistor (MOSFET), conducting polymers, a quartz crystal microbalance, or a surface acoustic wave (SAW). The MOSFET may detect odor molecules that have charges that affect the electric field in particular ways. The resulting sensor data 155 may correspond to particular compounds that are associated with a vehicle component. The conducting polymers may include organic polymers that conduct electricity in different ways based on the different types of odors. The quartz crystal microbalance may measure changes in the frequency of a quartz crystal resonator based on the odors. The SAW may detect modulation of surface acoustic waves as a result of the odors.

The vehicle component set 149 includes one or more vehicle components having a known odor that is associated with the failure or pending failure of that vehicle component. The known odor is described by the failure data 159. The vehicle component set 149 may include one or more of the following: a belt; a hose; brakes; an engine cooling system; an exhaust system (e.g., a catalytic converter); filters; fluids; a clutch; and any vehicle component whose operation is indicated by an odor.

The notification light 151 may include hardware that is operable to display a notification in the form of an illuminated light. For example, the notification light 151 may include a light on the dashboard of the vehicle 123 that lights up responsive to receiving an instruction from the olfactory system 199. In some embodiments, the notification light 151 includes multiple notification lights 151. For example, the dashboard of the vehicle 123 may include different notification lights 151 that correspond to different vehicle components in the vehicle component set 149, such as a notification light 151 for the brakes, a notification light 151 for the engine cooling system, etc. In this example, the notification lights 151 may form different shapes to resemble the vehicle component, such as a shape of a brake on a tire to represent the brake.

The head unit 152 may include hardware that is operable to display a notification. The head unit 152 includes a user interface and is typically positioned in the center of the dashboard so that it is accessible by a driver and a front-seat passenger. The head unit 152 may provide the user interface for controlling controlling music, obtaining driving directions, connecting Bluetooth, making phone calls, etc. In some embodiments, the head unit 152 provides vehicle 123 information including a notification about vehicle component failure. The head unit 152 may display a generic notification for each instance of vehicle component failure, such as a warning light, a recommendation to visit a service station, etc. In some embodiments, the head unit 152 may include specific information about vehicle component failure, such as the identification of a particular vehicle component.

The 3D-HUD 153 may include hardware for projecting a three-dimensional graphic in front of a windshield. For example, the 3D-HUD 153 may include a projector, a movable screen, a screen-driving unit, and an optical system. The 3D-HUD 153 is discussed in greater detail below with reference to FIG. 4.

The camera 154 may include hardware operable to capture images. The camera 154 may be located within the engine and positioned in a way to capture images of vehicle components. For example, the olfactory system 199 may determine that a particular vehicle component is experiencing or about to experience failure. The olfactory system 199 may instruct the camera 154 to capture an image of the particular vehicle component and use the image as part of a notification to the driver.

In some embodiments, the olfactory system 199 of the vehicle 123 may be implemented using hardware including a field-programmable gate array ("FPGA") or an application-specific integrated circuit ("ASIC"). In some other embodiments, the olfactory system 199 may be implemented using a combination of hardware and software. The olfactory system 199 may be stored in a combination of the devices (e.g., servers or other devices).

The olfactory system 199 includes code or routines that, when executed by the processor 125, cause the olfactory sensor set 147 to measure odors and record sensor data 155 in the memory 127 that describes these measurements. The olfactory system 199 includes code or routines that, when executed by the processor 125, causes the processor 125 to collect the sensor data 155 and transmit the sensor data 155 to the server 107. For example, the communication unit 145 transmits the sensor data 155 to the server 107 via the network.

The olfactory system 199 includes code or routines that, when executed by the processor 125, causes the communication unit 145 to receive failure data 159 from the server 107 via the network 105 and store the failure data 159 in the memory 127. The olfactory system 199 includes code or routines that, when executed by the processor 125, retrieves the failure data 159 from the memory 127, identifies a corresponding vehicle component that is described by the failure data 159, and generates a notification based on the failure data 159 and the corresponding vehicle component. The olfactory system 199 includes code or routines that, when executed by the processor 125, causes the notification to be provided to a driver of the vehicle 123. For example, the notification may be a notification light that is illuminated on the dashboard. In another example, the notification is displayed on a head unit or a 3D-HUD of the vehicle 123.

In this way, the olfactory system 199 of the vehicle 123 is operable to notify the driver that a vehicle component has failed or is about to fail.

For example, as belts and hoses begin to fail they emit a burnt rubber smell; as brakes fail they emit a sharp odor like bad cheese; as the engine cooling system beings to fail it emits a sweet smell; as the exhaust system fails it emits a rotten egg smell; and as filters and fluids fail, they emit a musty odor. The olfactory system 199 may notify the driver of the vehicle 123 that any of these vehicle components (or others) from the vehicle component set 149 are failing. As a result, the driver may visit a service station and minimize or prevent any damage to the vehicle 123 that could result from vehicle component failure.

The olfactory system 199 is described in more detail below with reference to FIG. 2.

Example Server 107

In some embodiments, the server 107 is a cloud server that includes one or more of the following elements: a processor 125; a memory 127; a communication unit 145; and a comparison system 150. The following elements of the server 107 are the same or similar to those described above for the vehicle 123, and so, the descriptions of these elements will not be repeated here: the processor 125; the memory 127; and the communication unit 145.

The memory 127 of the server 107 stores one or more of the following elements: sensor data 155; filtered data 157; and failure data 159. The sensor data 155 may be the same as the sensor data 155 stored on the vehicle 123. The sensor data 155 is received from the vehicle 123 via the network 105. The filtered data 157 is sensor data 155 that has been filtered to remove any noise that is present. The failure data 159 may include fingerprint compounds that correspond to failed vehicle components. The fingerprint compounds may be profiles of different compounds that would be emitted from failing vehicle components. The failure data 159 may also include match data that describes a match between the filtered data 157 and fingerprint compounds.

The comparison system 150 may include code and routines that are operable, when executed by the processor 125 of the server 107, to receive the sensor data 155, filter the sensor data to generate filtered data 157, and identify a match between the filtered data 157 and the failure data 159. For example, the comparison system 150 may identify that a burnt rubber odor of a belt or hose corresponds to a fingerprint compound for sulfur dioxide or another compound emitted by burnt rubber. In another example, the comparison system 150 may identify that a sharp odor such as rotten cheese or burnt carpet of a brake corresponds to a fingerprint compound that indicates that the brakes are overheating. In another example, the comparison system 150 may identify that a sweet smell of a cooling system corresponds to a fingerprint compound for ethylene glycol that results from the radiator, heater hose, a failed intake manifold gasket or cylinder head, etc. In another example, the comparison system 150 may identify a gasoline smell to a fingerprint compound for gasoline that suggests a gasoline leak in the vehicle 123. In another example, the comparison system 150 may identify a rotten egg odor for the exhaust system corresponds to a fingerprint compound for hydrogen sulfide, which indicates a problem with the catalytic converter. In another example, the comparison system 150 may identify a paper odor for the clutch that corresponds to a fingerprint compound that indicates that a clutch facing is burning off as the clutch slips. In yet another example, the comparison system 150 may identify a hot oil odor that corresponds to a fingerprint compound that indicates that oil is leaking onto the hot exhaust manifold.

The comparison system 150 may transmit the failure data 159 that describes the match to the vehicle 123. For example, the communication unit 145 of the server 107 may transmit the failure data 159 to the communication unit 145 of the vehicle 123 via the network 105.

Example Device 200 with an Olfactory System 199

Figure 2:
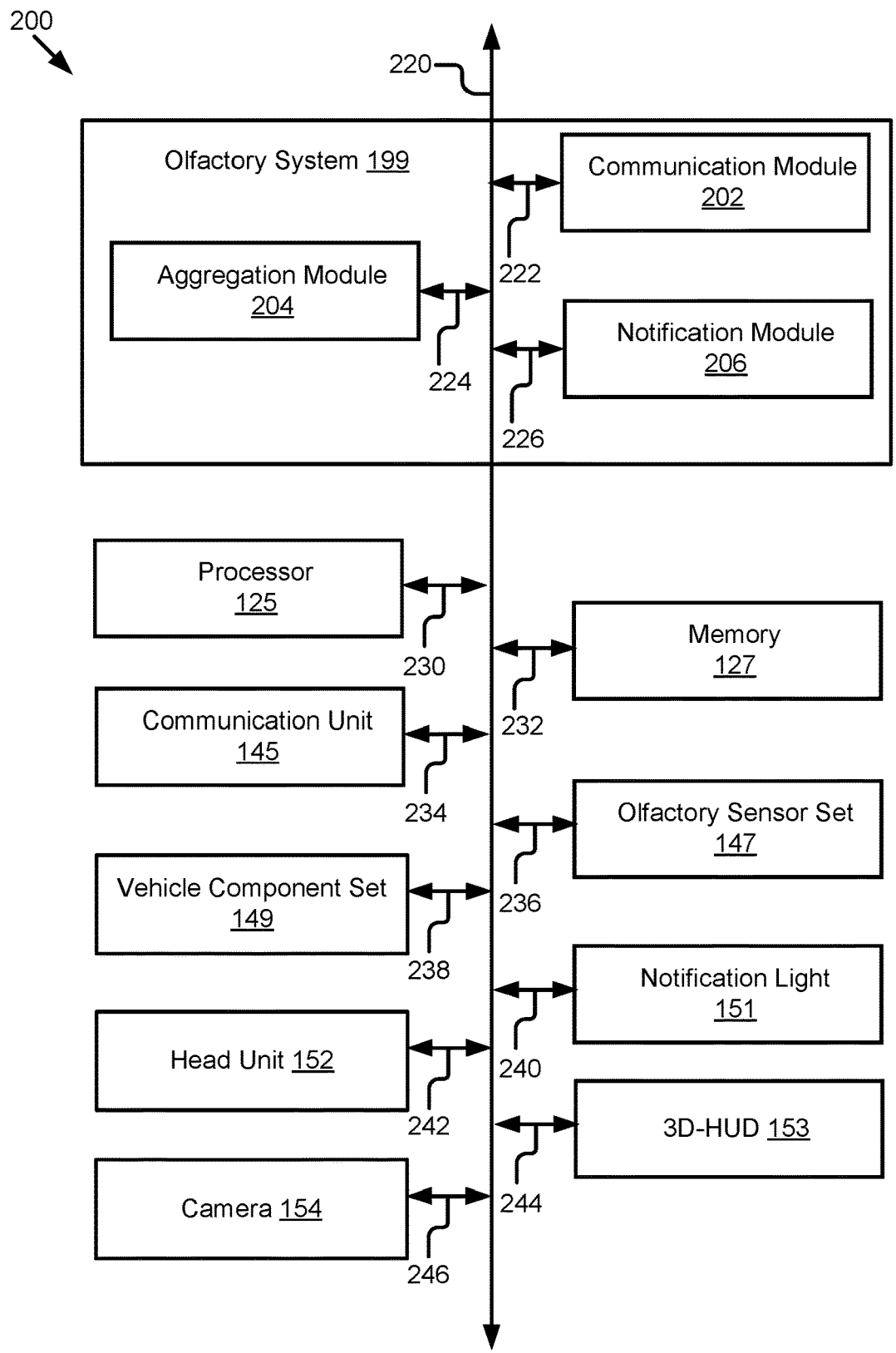
FIG. 2 is a block diagram illustrating an example device including the olfactory system according to some embodiments.

FIG. 2 is a block diagram illustrating an example device 200 including the olfactory system according to some embodiments. In some embodiments, the device 200 may include a special-purpose computer system that is programmed to perform one or more steps of a method 600 described below with reference to FIG. 6. In some embodiments, one or more components of the device 200 may be part of the server 107. In some embodiments, the device 200 may be an onboard vehicle computer of the vehicle 123. In some embodiments, the device 200 may include an electronic control unit, head unit or some other processor-based computing device of the vehicle 123.

The device 200 may include one or more of the following elements according to some examples: the olfactory system 199; the processor 125; the memory 127; the communication unit 145; the olfactory sensor set 147; the vehicle component set 149; the notification light 151; the head unit 152; the 3D-HUD; and a camera 154. The components of the device 200 are communicatively coupled by a bus 220.

In the illustrated embodiment, the processor 125 is communicatively coupled to the bus 220 via a signal line 230. The memory 127 is communicatively coupled to the bus 220 via a signal line 232. The communication unit 145 is communicatively coupled to the bus 220 via a signal line 234. The olfactory sensor set 147 is communicatively coupled to the bus 220 via a signal line 326. The vehicle component set 149 is communicatively coupled to the bus 220 via a signal line 238. The notification light 151 is communicatively coupled to the bus 220 via a signal line 240. The head unit 152 is communicatively coupled to the bus 220 via a signal line 242. The 3D-HUD 153 is communicatively coupled to the bus 220 via a signal line 244. The camera 154 is communicatively coupled to the bus 220 via a signal line 246.

The following elements of the device 200 were described above with reference to FIG. 1, and so, those descriptions will not be repeated here: the processor 125; the memory 127; the communication unit 145; the olfactory sensor set 147; the vehicle component set 149; the notification light 151; the head unit 152; the 3D-HUD 153; and the camera 154.

The memory 127 may store any of the data described above with reference to FIG. 1. The memory 127 may store any data needed for the device 200 to provide its functionality.

In the illustrated embodiment shown in FIG. 2, the olfactory system 199 includes a communication module 202, an aggregation module 204, and a notification module 206.

The communication module 202 can be software including routines for handling communications between the olfactory system 199 and other components of the device 200. In some embodiments, the communication module 202 can be a set of instructions executable by the processor 125 to provide the functionality described below for handling communications between the olfactory system 199 and other components of the device 200. In some embodiments, the communication module 202 can be stored in the memory 127 of the device 200 and can be accessible and executable by the processor 125. The communication module 202 may be adapted for cooperation and communication with the processor 125 and other components of the device 200 via signal line 222.

The communication module 202 sends and receives data, via the communication unit 145, to and from one or more elements of the operating environment 100. For example, the communication module 202 receives or transmits, via the communication unit 145, one or more of the following elements: the sensor data 155; the failure data 159; and the notification data 161. The communication module 202 may send or receive any of the data or messages described above with reference to FIG. 1 or below with reference to FIGS. 3A, 3B, 4, and 6 via the communication unit 145.

In some embodiments, the communication module 202 receives data from components of the vehicle 123 and stores the data in the memory 127. For example, the communication module 202 receives sensor data 155 from the olfactory sensor set 147 and stores the sensor data 155 in the memory 127. The communication module 202 may also retrieve data from the memory 127 for use by the components of the olfactory system 199. For example, the communication module 202 may retrieve the sensor data 155 for use by the aggregation module 204. In some embodiments, the communication module 202 instructs the olfactory sensor set 147 to measure the odors emanating from the vehicle component set 149. In some embodiments, the communication module 202 receives the sensor data 155 periodically or each time the sensor data 155 is collected by the olfactory sensor set 147.

The aggregation module 204 can be software including routines for aggregating the sensor data 155. In some embodiments, the aggregation module 204 can be a set of instructions executable by the processor 125 to provide the functionality described below for aggregating the sensor data 155. In some embodiments, the aggregation module 204 can be stored in the memory 127 of the device 200 and can be accessible and executable by the processor 125. The aggregation module 204 may be adapted for cooperation and communication with the processor 125 and other components of the device 200 via signal line 224.

The aggregation module 204 collects sensor data 155 from the olfactory sensor set 147 via the communication module 202 or retrieves the sensor data 155 from the memory 127. For example, the sensor data 155 may describe sensor measurements of an odor of a corresponding vehicle component from the vehicle component set 149. In another example, the sensor data 155 may describe sensor measurements of several odors from one or more corresponding vehicle components from the vehicle component set 149. This may occur if multiple vehicle components are emitting odors at the same time or if one vehicle component is emitting different kinds of odors.

In some embodiments, the aggregation module 204 determines that a particular odor corresponds to a particular vehicle component. The aggregation module 204 may index (or, e.g., tag) the sensor data 155 by the corresponding vehicle component. For example, the aggregation module 204 may index sensor data 155 for an odor as corresponding to a belt of the vehicle 123. In some embodiments, the aggregation module 204 aggregates the sensor data 155 from multiple vehicle components.

The communication module 202 transmits the sensor data 155 to the server 107 via the network 105. For example, the communication module 202 transmits the sensor data 155 to the communication unit 145, which transmits the sensor data 155 to the network 105. The communication module 202 may transmit aggregated sensor data 155 from multiple vehicle components. The aggregated sensor data 155 may include information about which vehicle component corresponds to each odor described by the aggregated sensor data 155. In some embodiments, the communication module 202 transmits the sensor data 155 at regular intervals (e.g., every minute, every hour, every day, etc.).

The notification module 206 can be software including routines for generating a notification. In some embodiments, the notification module 206 can be a set of instructions executable by the processor 125 to provide the functionality described below for generating the notification. In some embodiments, the notification module 206 can be stored in the memory 127 of the device 200 and can be accessible and executable by the processor 125. The notification module 206 may be adapted for cooperation and communication with the processor 125 and other components of the device 200 via signal line 226.

In some embodiments, the notification module 206 receives failure data 159 from the server 107 that describes a match between the sensor data 155 and a fingerprint compound that corresponds to a failed vehicle component. For example, the failure data 159 may describe a match between a burnt rubber odor and a fingerprint compound that corresponds to belt failure. The notification module 206 may identify the corresponding vehicle component that is described by the failure data 159. For example, the notification module 206 may identify that it is a belt of the vehicle 123 that is about to fail or is failing. The notification module 206 may identify the corresponding vehicle component based on the sensor data 155 being indexed or tagged with the corresponding vehicle component.

The notification module 206 generates notification data 161 that describes a notification based on the failure data and the corresponding vehicle component. The notification module 206 may store the notification data 161 in the memory 127. The notification module 206 provides the notification to a driver of the vehicle 123. The notification may be a light on a dashboard, a notification on a head unit, or a notification on a 3D-HUD.

Figure 3A:
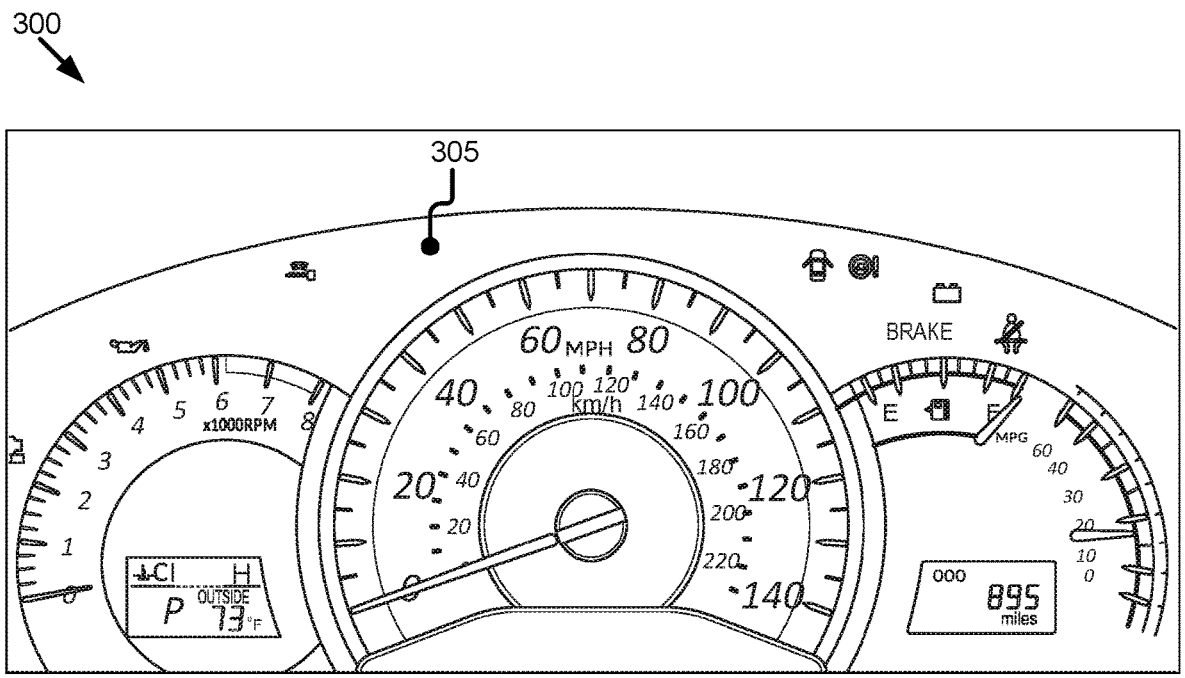
FIG. 3A is an example dashboard with a notification light.

Turning now to FIG. 3A, an example dashboard 400 with a notification light 151 is illustrated. In this example, the notification module 206 instructs the notification light 305 on a dashboard of the vehicle 123 to illuminate to notify the driver of the vehicle 123 to bring the vehicle 123 to a service station. Although only one notification light 305 is illustrated in this example, in some embodiments multiple notification lights are displayed and correspond to different vehicle components that are about to fail or are failing.

In some embodiments, the notification data 161 includes graphical data for displaying the notification. The notification module 206 may transmit the graphical data to the head unit 152 or the 3D-HUD 153 for display.

Figure 3B:
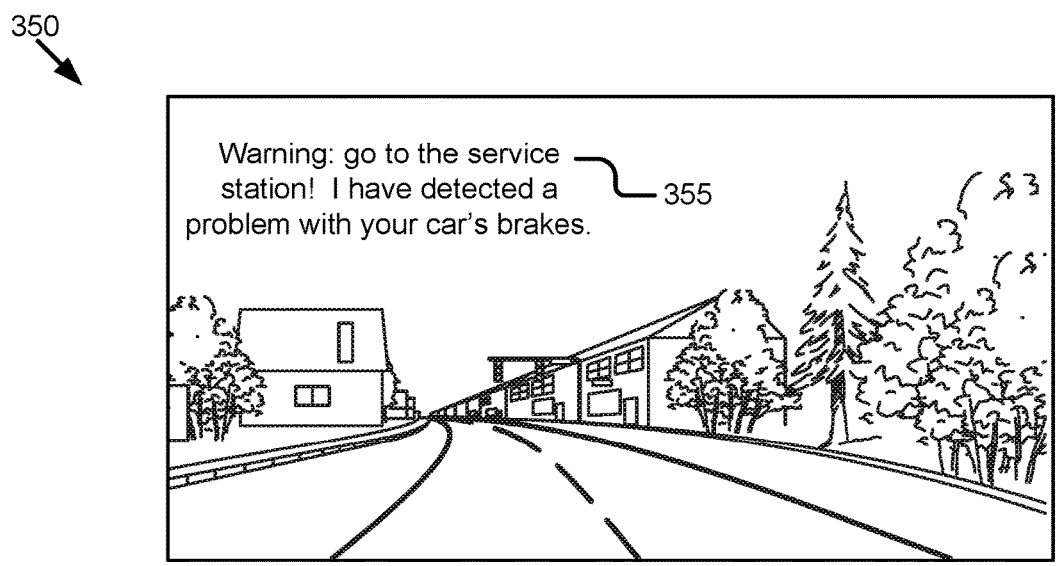
FIG. 3B is an example three-dimensional heads-up-display that includes a notification.

Turning to FIG. 3B, an example 3D-HUD 350 that includes a notification 355 is illustrated. In this example, the 3D-HUD 350 projects an image in front of a windshield, for example, to allow the road and the driver's surroundings to remain visible. The 3D-HUD 350 displays a notification 355. The notification may include an instruction to visit a service station, information about the particular vehicle component that is failing, etc. In this example, the notification 355 states "Warning: go to the service station! I have detected a problem with your car's brakes." In some embodiments, the notification 355 may also include an image of the vehicle component failure (not illustrated) as captured by the camera 154 in the vehicle 123.

The notification displayed by a head unit 152 may be similar to the notification displayed by the 3D-HUD 153 as illustrated in FIG. 4B. The notification may include an instruction to visit a service station, information about the particular vehicle component that is failing, and/or include an image of the vehicle component failure.

Example 3D-HUD 153

Figure 4:
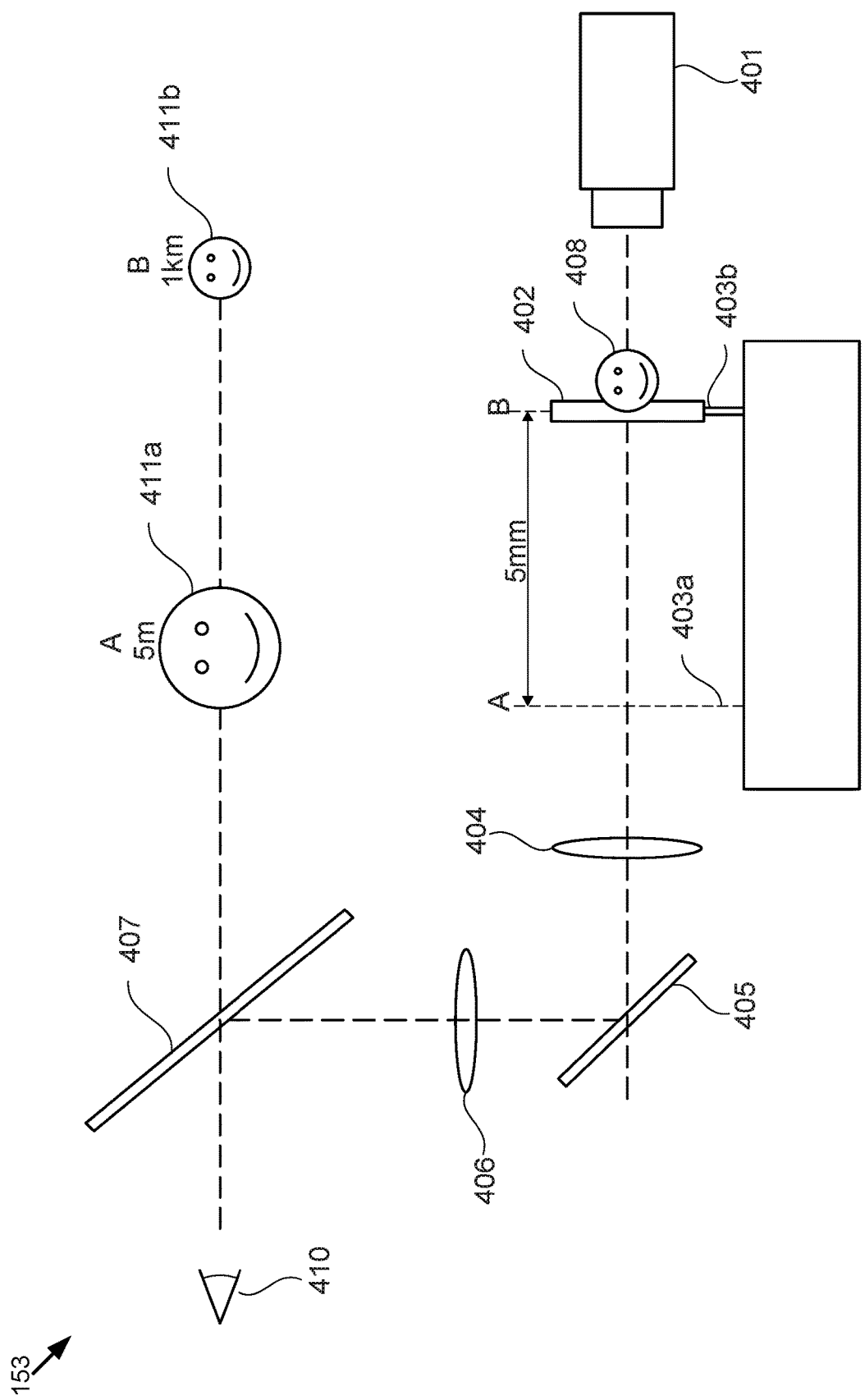
FIG. 4 is a block diagram illustrating a three-dimensional heads-up display according to some embodiments.

Referring to FIG. 4, depicted is a block diagram illustrating a 3D-HUD 153 of a vehicle 123. In some embodiments, the 3D-HUD 153 includes a projector 401, a movable screen 402, a screen-driving unit 403, and an optical system (including lenses 404, 406, a reflector 405, etc.). The projector 401 may be any kind of projector such as a digital mirror device (DMD) project, or a liquid crystal projector. The projector 401 projects an image (graphic) 408 on the movable screen 402. The image 408 may include a graphical overlay. For example, the image 408 may be the notification as described above with reference to FIG. 2.

The movable screen 402 includes a transparent plate and so the light of the projected image transmits through the movable screen 402 to be projected on the windshield 407 of a vehicle (e.g., the vehicle 123). The image projected on the windshield 407 is perceived by a driver 410 as if it is a real object (shown as 411a, 411b) that exists in the three-dimensional space of the real-world, as opposed to an object that is projected on the windshield.

In some embodiments, the 3D-HUD is capable of controlling the direction of the image relative to the driver 410 (in other words, the image position in the windshield) by adjusting the projection position on the screen 402. Further the screen 402 is movable by the screen-driving unit 403 in the range between the positions 403a and 403b. Adjusting the position of the screen 402 can vary the depth (distance) of the projected image from the driver 410 in the real-world. In one example, the movable range of the screen 402 (distance between positions 403a and 403b) may be 5 mm, which correspond to from 5 m away to infinity in the real-world. The use of the 3D-HUD allows the driver 410 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D-HUD depicted in FIG. 4 is provided by way of example. Other examples are possible. These examples may include heads-up displays having more or less complexity than the 3D-HUD depicted in FIG. 4. For example, it is anticipated that in the future there will be heads-up displays that do not require movable parts such as the movable screen 402. For example, a static screen that does not move may be deployed. The heads-up display deployed may not be a two-dimensional heads-up display unit. In some embodiments, the olfactory system 199 is designed to be operable with such components.

Example Device 500 with a Comparison System 150

Figure 5:
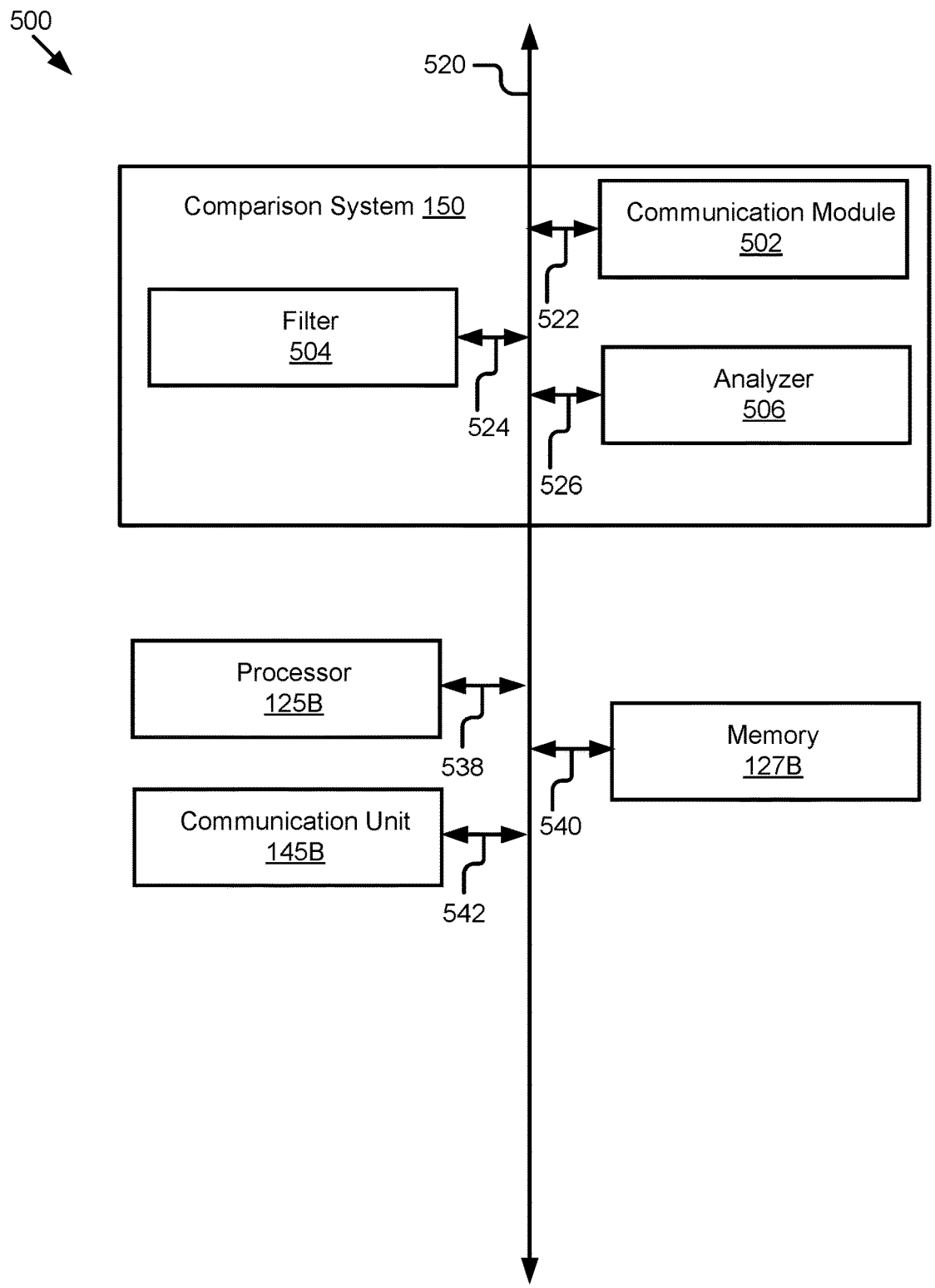
FIG. 5 is a block diagram illustrating an example device including the comparison system according to some embodiments.

FIG. 5 is a block diagram illustrating an example device 500 including the comparison system 150 according to some embodiments. In some embodiments, the device 500 may include a special-purpose computer system that is programmed to perform one or more steps of a method 700 described below with reference to FIG. 7. In some embodiments, one or more components of the device 500 may be part of the server 107. In some embodiments, the device 500 may be the server 107. In some embodiments, the device 500 may include an electronic control unit, head unit or some other processor-based computing device of the vehicle 123.

The device 500 may include one or more of the following elements according to some examples: the comparison system 150; the processor 125; the memory 127; and the communication unit 145. The components of the device 200 are communicatively coupled by a bus 120.

In the illustrated embodiment, the processor 125 is communicatively coupled to the bus 520 via a signal line 538. The memory 127 is communicatively coupled to the bus 520 via a signal line 540. The communication unit 145 is communicatively coupled to the bus 520 via a signal line 542.

The following elements of the device 500 were described above with reference to FIG. 1, and so, those descriptions will not be repeated here: the processor 125; the memory 127; and the communication unit 145.

The memory 127 may store any of the data described above with reference to FIG. 1. The memory 127 may store any data needed for the device 200 to provide its functionality.

In the illustrated embodiment shown in FIG. 5, the comparison system 150 includes a communication module 202, a filter 504, and an analyzer 506.

The communication module 502 can be software including routines for handling communications between the comparison system 150 and other components of the device 500. In some embodiments, the communication module 502 can be a set of instructions executable by the processor 125 to provide the functionality described below for handling communications between the comparison system 150 and other components of the device 500. In some embodiments, the communication module 502 can be stored in the memory 127 of the device 500 and can be accessible and executable by the processor 125. The communication module 502 may be adapted for cooperation and communication with the processor 125 and other components of the device 500 via signal line 522.

The communication module 502 sends and receives data, via the communication unit 145, to and from one or more elements of the operating environment 100. For example, the communication module 502 receives or transmits, via the communication unit 145, one or more of the following elements: the sensor data 155; the filtered data 157; and the failure data 159. The communication module 502 may send or receive any of the data or messages described above with reference to FIG. 1 or below with reference to FIGS. 5 and 7 via the communication unit 145.

In some embodiments, the communication module 502 receives data from components of the server 107 and stores the data in the memory 127. For example, the communication module 502 receives sensor data 155 from the communication unit 145 and stores the sensor data 155 in the memory 127. The communication module 502 may also retrieve data from the memory 127 for use by the components of the comparison system 150. For example, the communication module 502 may retrieve failure data 159 from the memory 127 for use by the analyzer 506.

In some embodiments, the communication module 502 handles communications between the components of the comparison system 150. For example, the communication module 502 may transmit filtered data 157 generated by the filter 504 to the analyzer 506.

The filter 504 can be software including routines for filtering sensor data 155. In some embodiments, the filter 504 can be a set of instructions executable by the processor 125 to provide the functionality described below for filtering data. In some embodiments, the filter 504 can be stored in the memory 127 of the device 500 and can be accessible and executable by the processor 125. The filter 504 may be adapted for cooperation and communication with the processor 125 and other components of the device 500 via signal line 524.

In some embodiments, the olfactory sensor set 147 of the vehicle 123 may generate noise that gets detected by the olfactory sensor set 147 and incorporated into the sensor data 155. The noise may interfere with the identification of a match between the sensor data 155 and a fingerprint compound. For example, a first olfactory sensor may generate a dynamic current that produces electromagnetic disturbances that are detected by other olfactory sensors in the olfactory sensor set 147. The noise may change as a function of temperature, humidity, and a natural shift of the baseline for the olfactory sensor set 147.

As a result, the filter 504 may identify noise from the sensor data 155 and remove the noise from the sensor data 155 so that the sensor data 155 may be more accurately compared to failure data 159 to identify fingerprint compounds that correspond to vehicle component failure. In some embodiments, the filter 504 filters the sensor data 155 and generates filtered data 157 that has the noise removed from the sensor data 155. The filter 504 may store the filtered data 157 in the memory 127 or transmit the filtered data 157 to the analyzer 506.

The analyzer 506 can be software including routines for analyzing sensor data 155 or filtered data 157. In some embodiments, the analyzer 506 can be a set of instructions executable by the processor 125 to provide the functionality described below for analyzing the sensor data 155 or the filtered data 157. In some embodiments, the analyzer 506 can be stored in the memory 127 of the device 500 and can be accessible and executable by the processor 125. The analyzer 506 may be adapted for cooperation and communication with the processor 125 and other components of the device 500 via signal line 526.

The analyzer 506 determines where there is a match between the sensor data 155 or the filtered data 157 and failure data 159 that corresponds to a vehicle component that is failing or has already failed. For example, the analyzer 506 may query a database that includes the failure data 159 to identify the match. The failure data 159 may describe a fingerprint compound that is a profile for a failed vehicle component, where the failed vehicle component is defined as a vehicle component that is about to fail or has already failed. For example, a failing catalytic converter may smell like rotten eggs because the catalytic converter fails to break down sulfur. The analyzer 506 may compare sensor data 155 or filtered data 157 for the catalytic converter to failure data 159 to identify a match between the sensor data 155 or the filtered data 157 and a fingerprint compound for sulfur. Once the match is found, the analyzer 506 transmits the failure data 159 that describes the match to the network 105, where the network 105 transmits the failure data to the vehicle 123.

In some embodiments, the analyzer 506 comprises several analyzers 506 that are each operable to compare the sensor data 155 or the filtered data 157 to failure data 159 that corresponds to fingerprint compounds for particular vehicle components. For example, the analyzer 506 may include a first analyzer 506 that analyzes failure data 159 for belts and hoses, a second analyzer 506 that analyzes failure data 159 for brakes, a third analyzer 506 that analyzes failure data 159 for an engine cooling system, a fourth analyzer 506 that analyzes failure data 159 for an exhaust system, a fifth analyzer 506 that analyzes failure data 159 for filters and fluids, etc. In some embodiments, because the sensor data 155 or the filtered data 157 may be indexed according to the particular vehicle component associated with the data, the data may be divided according to analyzers 506 that correspond to the particular vehicle components. The analyzer 506 may transmit the failure data 159 that describes the match from a particular analyzer 506 to the network 105 for transmission to the vehicle 123.

Example Methods

Referring now to FIG. 6, depicted is a flowchart of an example method 600 for notifying a driver of vehicle component failure using an olfactory system 199 according to some embodiments. The vehicle functionality may be provided by components of the vehicle 123 described above with reference to FIG. 1. One or more of the steps described herein for the method 700 may be executed by one or more devices 200.

At step 605, sensor data 155 is collected from an olfactory sensor set 147 of a vehicle 123, where the sensor data 155 describes sensor measurements of a corresponding vehicle component. For example, the olfactory sensor set 147 may collect a musty odor being emitted from a filter of the vehicle 123. At step 610, the sensor data 155 is transmitted to a network 105 that transmits the sensor data 155 to a server 107.

At step 615, failure data 159 is received from the server 107 that describes a match between the sensor data 155 and a fingerprint compound that corresponds to a failed vehicle component. For example, the match may be a match between sensor data 155 describing the musty odor and a fingerprint compound for bacteria growth that corresponds to a filter of the vehicle 123 that needs to be replaced because it is growing bacteria. At step 620, the corresponding vehicle component that is described by the failure data 159 is identified. For example, the failure data 159 describing the match may also include an identification of the corresponding vehicle component or the corresponding vehicle component may be identified based on the failure data 159.

At step 625, a notification is generated based on the failure data 159 and the corresponding vehicle component. At step 630, the notification is provided to a driver of the vehicle 123. For example, providing the notification may include causing a notification light on a dashboard of the vehicle 123 to become illuminated. In another example, providing the notification includes displaying the notification on at least one of a head unit of the vehicle or a 3D-HUD display.

Figure 7:
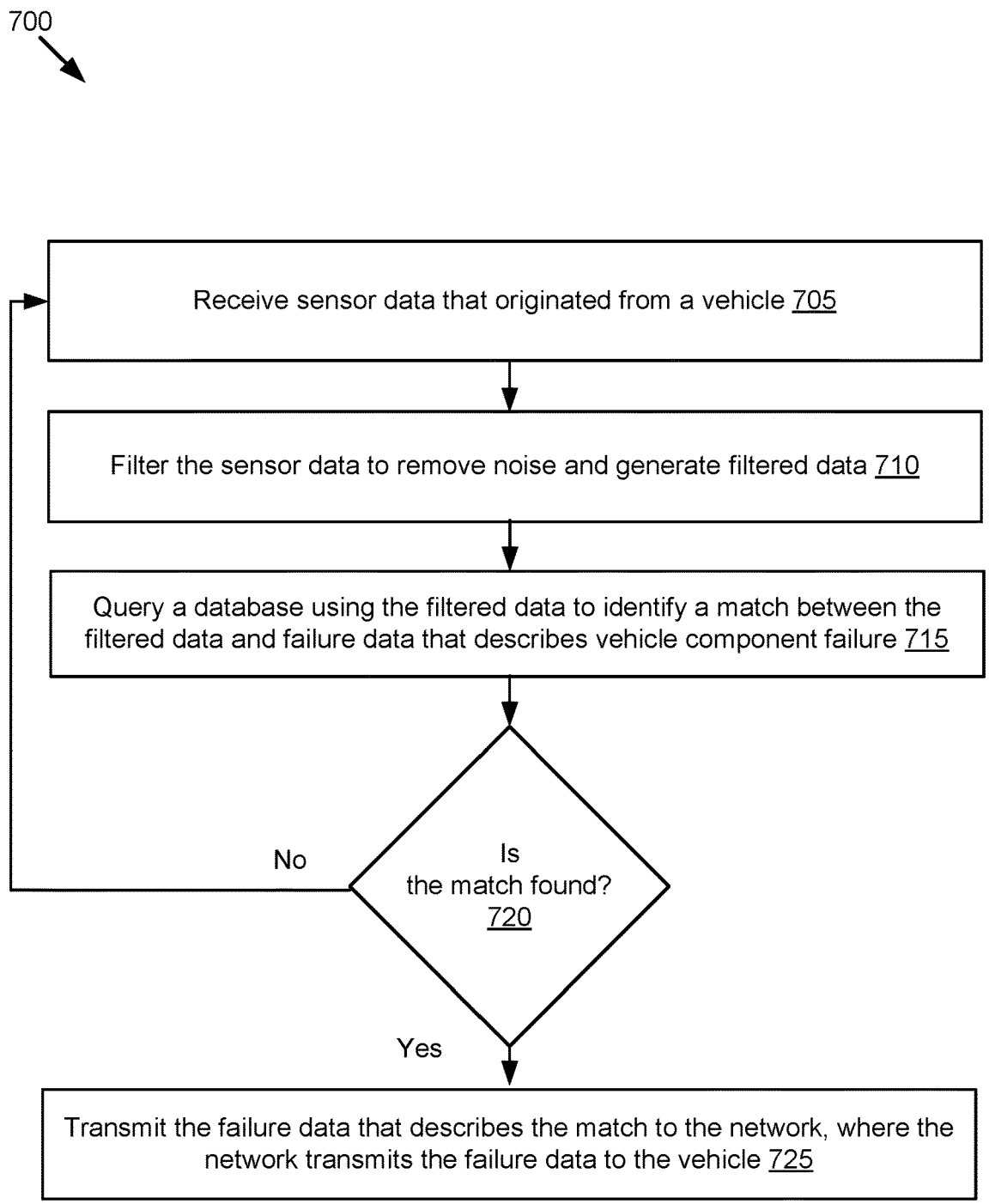
FIG. 7 includes a flowchart of an example for determining a match between filtered data and fingerprint data using a comparison system according to some embodiments.

FIG. 7 includes a flowchart of an example for determining a match between filtered data and fingerprint data using a comparison system 150 according to some embodiments. One or more of the steps described herein for the method 700 may be executed by one or more devices 500.

At step 705, sensor data 155 that originated from a vehicle 123 is received. At step 710, the sensor data 155 is filtered to remove noise and generate filtered data 157. For example, the sensor data 155 is filtered to remove noise generated by sensors in the olfactory sensor set 147 and not from the vehicle component set 149.

At step 715, a data base is queried using the filtered data 157 to identify a match between the filtered data 157 and failure data that describes vehicle component failure. At step 720, it is determined whether a match is found. If no match is found, the method 700 returns to step 705. If a match is found, the failure data 159 that describes the match is transmitted to the network 105, where the network 105 transmits the failure data 159 to the vehicle 123.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   collecting sensor data from an olfactory sensor set of a vehicle, wherein the sensor data describes sensor measurements of an odor of a corresponding vehicle component, wherein the sensor data is received by a server;
   receiving failure data from the server that describe a match between the sensor data and a fingerprint compound that corresponds to a failed vehicle component;
   identifying the corresponding vehicle component that is described by the failure data;
   capturing an image of the corresponding vehicle component that is described by the failure data;
   generating a notification based on the failure data and the corresponding vehicle component; and
   providing the notification to a driver of the vehicle by displaying the notification and the image of the corresponding vehicle component on at least one of a head unit of the vehicle and a three-dimensional heads-up display.

2. The method of claim 1, wherein providing the notification includes causing a notification light on a dashboard of the vehicle to become illuminated.

3. The method of claim 1, wherein the notification includes an instruction to visit a service station.

4. The method of claim 1, wherein the notification includes a description of the corresponding vehicle component.

5. The method of claim 1, further comprising:
   identifying noise from the sensor data; and
   removing the noise from the sensor data.

6. The method of claim 1, further comprising:
   indexing the sensor data by the corresponding vehicle component.

7. The method of claim 1, further comprising:
   aggregating sensor data from multiple corresponding vehicle components;
   transmitting aggregated sensor data to a network that transmits the aggregated sensor data to the server; and
   wherein identifying the corresponding vehicle component includes identifying the multiple corresponding vehicle components.

8. The method of claim 1, wherein the failed vehicle component includes one or more of a belt, a hose, a brake, an engine cooling system, an exhaust system, a filter, and a clutch.

9. The method of claim 1, wherein the olfactory sensor set of the vehicle include at least one of a MOSFET and a polymer.

10. A system comprising:
    one or more processors coupled to a memory;
    a filter stored in the memory and executable by the one or more processors, the one or more processors causing the filter to:
      receive sensor data that originated from a vehicle; and
      filter the sensor data to remove noise and generate filtered data;
    an analyzer stored in the memory and executable by the one or more processors, the one or more processors causing the analyzer to:
      determine whether there is a match between the filtered data and failure data that corresponds to a failed vehicle component; and
      responsive to determining that there is the match, transmitting the failure data to a network, wherein the network transmits the failure data to the vehicle; and
    the vehicle including a camera that captures an image of a corresponding vehicle component that is described by the failure data and at least one of a head unit and a three-dimensional heads-up display, the head unit or the three-dimensional heads-up display displaying a notification and the image of the corresponding vehicle component.

11. The system of claim 10, wherein the analyzer determines a plurality of matches between the filtered data and a plurality of failed vehicle components.

12. The system of claim 10, wherein the one or more processors further cause the analyzer to, responsive to determining that there is not the match between the filtered data and the failure data that corresponds to the failed vehicle component, receive additional sensor data and continue to determine whether there is the match between the filtered data and the failure data.

13. The system of claim 10, wherein the analyzer includes a first analyzer that analyzes the filtered data corresponding to a first vehicle component and a second analyzer that analyzes the filtered data corresponding to a second vehicle component.

14. A computer program product comprising a non-transitory memory of an onboard vehicle computer system of a vehicle storing computer-executable code that, when executed by the onboard vehicle computer system, causes the onboard vehicle computer system to:
    collect sensor data from an olfactory sensor set of a vehicle, wherein the sensor data describes sensor measurements of an odor of a corresponding vehicle component, wherein the sensor data is received by a server;
    receive failure data from the server that describe a match between the sensor data and a fingerprint compound that corresponds to a failed vehicle component;
    identify the corresponding vehicle component that is described by the failure data;
    capture an image of the corresponding vehicle component that is described by the failure data;
    generate a notification based on the failure data and the corresponding vehicle component; and
    provide the notification to a driver of the vehicle by displaying the notification and the image of the corresponding vehicle component on at least one of a head unit of the vehicle and a three-dimensional heads-up display.

15. The computer program product of claim 14, wherein providing the notification includes causing a notification light on a dashboard of the vehicle to become illuminated.

16. The computer program product of claim 14, wherein the notification includes an instruction to visit a service station.

17. The computer program product of claim 16, wherein the notification includes a description of the corresponding vehicle component.

18. The computer program product of claim 14, wherein the computer-executable code further causes the onboard vehicle computer system to:
   identify noise from the sensor data; and
   remove the noise from the sensor data.

19. The computer program product of claim 14, wherein the computer-executable code further causes the onboard vehicle computer system to:
   index the sensor data by the corresponding vehicle component.

20. The computer program product of claim 14, wherein the computer-executable code further causes the onboard vehicle computer system to:
   aggregate sensor data from multiple corresponding vehicle components;
   transmit aggregated sensor data to a network that transmits the aggregated sensor data to the server; and
   wherein identifying the corresponding vehicle component includes identifying the multiple corresponding vehicle components.

\* \* \* \* \*